United States Patent
Kuriyama et al.

(10) Patent No.: US 9,296,949 B2
(45) Date of Patent: Mar. 29, 2016

(54) NEMATIC LIQUID CRYSTAL COMPOSITION AND LIQUID CRYSTAL DISPLAY ELEMENT USING THE SAME

(75) Inventors: Takeshi Kuriyama, Kitaadachi-gun (JP); Joji Kawamura, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 13/822,971

(22) PCT Filed: Aug. 16, 2012

(86) PCT No.: PCT/JP2012/070836
§ 371 (c)(1),
(2), (4) Date: Jul. 22, 2013

(87) PCT Pub. No.: WO2013/175645
PCT Pub. Date: Nov. 28, 2013

(65) Prior Publication Data
US 2015/0060733 A1    Mar. 5, 2015

(30) Foreign Application Priority Data

May 23, 2012  (JP) .................................. 2012-117546

(51) Int. Cl.
| | | |
|---|---|---|
| C09K 19/54 | (2006.01) |
| C09K 19/30 | (2006.01) |
| C09K 19/34 | (2006.01) |
| C09K 19/44 | (2006.01) |
| C09K 19/06 | (2006.01) |
| C09K 19/20 | (2006.01) |
| C09K 19/04 | (2006.01) |
| C09K 19/12 | (2006.01) |

(52) U.S. Cl.
CPC ......... *C09K 19/3003* (2013.01); *C09K 19/0403* (2013.01); *C09K 19/062* (2013.01); *C09K 19/20* (2013.01); *C09K 19/3066* (2013.01); *C09K 19/44* (2013.01); *C09K 19/54* (2013.01); *C09K 2019/0448* (2013.01); *C09K 2019/0466* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3422* (2013.01); *C09K 2019/548* (2013.01)

(58) Field of Classification Search
CPC ..................... C09K 19/548; C09K 2019/0466; C09K 2019/0448; C09K 2019/122; C09K 2019/123; C09K 2019/124; C09K 2019/3004; C09K 2019/3009; C09K 2019/301; C09K 2019/3016; C09K 2019/3019; C09K 2019/325; C09K 2019/548

USPC .............. 252/299.01, 299.5, 299.61, 299.63, 252/299.66; 428/1.1
See application file for complete search history.

(56) References Cited

U.S. PATENT DOCUMENTS

| | | | |
|---|---|---|---|
| 5,733,477 A | 3/1998 | Kondo et al. | |
| 6,051,288 A | 4/2000 | Kondo et al. | |
| 6,210,603 B1 | 4/2001 | Kondo et al. | |
| 6,444,278 B1 * | 9/2002 | Reiffenrath et al. | ........... 428/1.1 |
| 7,662,443 B2 * | 2/2010 | Heckmeier et al. | ........... 428/1.1 |
| 8,999,460 B2 * | 4/2015 | Goebel | ............. C09K 19/3483 252/299.01 |
| 2003/0197153 A1 | 10/2003 | Heckmeier et al. | |
| 2008/0121843 A1 | 5/2008 | Heckmeier et al. | |
| 2009/0194739 A1 * | 8/2009 | Wittek et al. | ............ 252/299.61 |
| 2010/0181533 A1 * | 7/2010 | Jansen et al. | ............. 252/299.63 |
| 2012/0032112 A1 * | 2/2012 | Czanta et al. | ............ 252/299.64 |
| 2012/0268706 A1 * | 10/2012 | Goebel | ............. C09K 19/3483 349/143 |

FOREIGN PATENT DOCUMENTS

| | | |
|---|---|---|
| JP | 9-124529 A | 5/1997 |
| JP | 9-157202 A | 6/1997 |
| JP | 2003-183656 A | 7/2003 |
| JP | 2006-169472 A | 6/2006 |
| WO | 96/32365 A1 | 10/1996 |
| WO | 98/23564 A1 | 6/1998 |

OTHER PUBLICATIONS

English translation by computer for JP 2006/169472, http://www4.ipdl.inpit.go.jp/Tokujitu/PAJdetail.ipdl?N0000=60&N0120=01&N2001=2&N3001=2006-169472.*
International Search Report of PCT/JP2012/070836 dated Oct. 2, 2012, with forms PCT/ISA/220 and PCT/ISA/237. (with Partial English translation).

* cited by examiner

*Primary Examiner* — Shean C Wu
(74) *Attorney, Agent, or Firm* — Westerman, Hattori, Daniels & Adrian, LLP

(57) ABSTRACT

The nematic liquid crystal composition exhibits a positive dielectric anisotropy ($\Delta\in$), the liquid crystal composition being useful as a liquid crystal display material, and a liquid crystal display element using the same. The liquid crystal composition of the present invention has a large absolute value of dielectric anisotropy thereof and a low viscosity. By using this liquid crystal composition, it is possible to provide a liquid crystal display element which has a high contrast, high-speed responsiveness, and good display quality in which image sticking and display defects are not generated. The liquid crystal display element using the liquid crystal composition is a useful display element which realizes both high-speed response and suppression of display defects. In particular, the liquid crystal display element is useful as a liquid crystal display element for active-matrix driving, and can be applied to, for example, an IPS-type or TN-type liquid crystal display element.

20 Claims, No Drawings

NEMATIC LIQUID CRYSTAL COMPOSITION AND LIQUID CRYSTAL DISPLAY ELEMENT USING THE SAME

TECHNICAL FIELD

The present invention relates to a nematic liquid crystal composition that exhibits a positive dielectric anisotropy ($\Delta\in$), the liquid crystal composition being useful as a liquid crystal display material, and a liquid crystal display element using the same.

BACKGROUND ART

Liquid crystal display elements are used in not only watches and electronic calculators, but also various measuring instruments, panels for automobiles, word processors, electronic notebooks, printers, computers, televisions, clocks, advertisement display boards, etc. Typical examples of a liquid crystal display system include a twisted nematic (TN)-type display, a super-twisted nematic (STN)-type display, a vertical alignment (VA)-type display using a thin-film transistor (TFT), and an in-plane-switching (IPS)-type display. It is desired that liquid crystal compositions used in these liquid crystal display elements be stable against external factors such as moisture, air, heat, and light, exhibit a liquid crystal phase in as wide a temperature range as possible with room temperature being at the center of the range, have low viscosities, and have low drive voltages. Furthermore, the liquid crystal compositions each contain several types to several tens of types of compounds for the purpose of optimizing, for example, dielectric anisotropy ($\Delta\in$) and/or birefringence ($\Delta n$) for respective display elements.

In vertical alignment displays, liquid crystal compositions having a negative $\Delta\in$ are used, and in horizontal alignment displays such as the TN-type display, the STN-type display, and the IPS-type display, liquid crystal compositions having a positive $\Delta\in$ are used. Furthermore, a driving system has also been reported in which a liquid crystal composition having a positive $\Delta\in$ is vertically aligned when no voltage is applied, and a display is performed by applying a lateral electric field. Thus, the need for a liquid crystal composition having a positive $\Delta\in$ has been further increasing. On the other hand, in all the driving systems, low-voltage driving, high-speed response, and a wide operating temperature range have been desired. Specifically, a large positive absolute value of $\Delta\in$, a low viscosity ($\eta$), and a high nematic phase-isotropic liquid phase transition temperature ($T_{ni}$) have been desired. Furthermore, it is necessary to control the $\Delta n$ of a liquid crystal composition to be in an appropriate range in accordance with a cell gap on the basis of a value of $\Delta n \times d$, which is the product of the $\Delta n$ and the cell gap (d). In addition, in the case where a liquid crystal display element is applied to a television or the like, high-speed responsiveness is important and thus a liquid crystal composition having a small rotational viscosity $\gamma_1$ is required.

Liquid crystal compositions containing, as a component of the liquid crystal compositions, a compound represented by formula (A-1) or (A-2), which is a liquid crystal compound having a positive $\Delta\in$, have been disclosed (PTL 1 to PTL 4).

[Chem. 1]

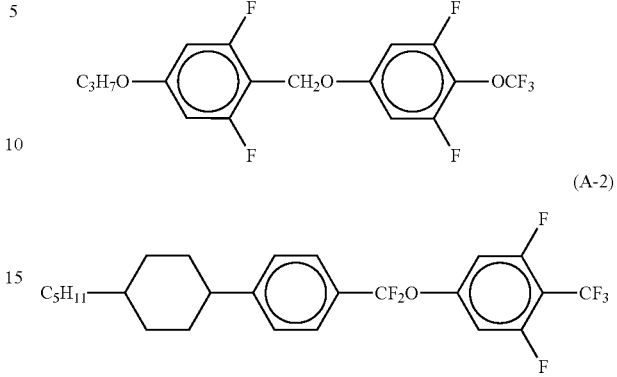

In order to practically use a liquid crystal composition in a liquid crystal display element, it is necessary that no problem occur in terms of display quality. In particular, a liquid crystal composition used in an active-matrix driving liquid crystal display element that is driven by TFT elements or the like needs to have a high specific resistance or a high voltage holding ratio. In addition, it is also necessary for such a liquid crystal composition to be stable against external stimuli such as light and heat. To meet this requirement, antioxidants for improving stability against heat and liquid crystal compositions containing the antioxidants have been disclosed (refer to PTL 3 and PTL 4). However, the stability is not necessarily sufficient. In particular, liquid crystal compounds having a large $\Delta\in$ have relatively low stability against light and heat, and thus such a composition does not have sufficient quality stability.

Furthermore, with the increasing number of applications for liquid crystal display elements, methods of using the liquid crystal display elements and methods of producing the liquid crystal display elements have also been significantly changed. In order to catch up with these changes, it has been desired to optimize properties other than known basic physical property values. Specifically, regarding liquid crystal display elements that use liquid crystal compositions, vertical alignment (VA)-type liquid crystal display elements, in-plane-switching (IPS)-type liquid crystal display elements, and the like have been widely used, and very large display elements having a 50-inch or larger display size have been practically used. Regarding a method for injecting a liquid crystal composition into a substrate, with the increase in the size of substrates, a one-drop-fill (ODF) method has been mainly used instead of a known vacuum injection method. However, it has been found that a drop mark formed when a liquid crystal composition is dropped on a substrate results in a problem of a decrease in the display quality. In order to form a pre-tilt angle of a liquid crystal material in a liquid crystal display element and to realize high-speed responsiveness, polymer-stabilized (PS) liquid crystal display elements have been developed. These display elements are characterized in that a monomer is added to a liquid crystal composition and that the monomer in the composition is cured. In many cases, the monomer is cured by irradiating the composition with ultraviolet light. Therefore, in the case where a component having low stability against light is added to the liquid crystal composition, the specific resistance or the voltage holding ratio is decreased, and in some cases, the generation of a drop mark may also be induced, resulting in a problem of a decrease in the yield of the liquid crystal display element due to display defects.

Accordingly, it has been desired to develop a liquid crystal display element which has high stability against light, heat, etc. and in which display defects such as image sticking and a drop mark do not tend to occur while maintaining characteristics and performance, such as high-speed responsiveness, which are desired for the liquid crystal display element.

CITATION LIST

Patent Literature

PTL 1: International Publication No. WO96/032365
PTL 2: Japanese Unexamined Patent Application Publication No. 09-157202
PTL 3: International Publication No. WO98/023564
PTL 4: Japanese Unexamined Patent Application Publication No. 2003-183656
PTL 5: Japanese Unexamined Patent Application Publication No. 9-124529
PTL 6: Japanese Unexamined Patent Application Publication No. 2006-169472

SUMMARY OF INVENTION

Technical Problem

An object of the present invention is to provide a liquid crystal composition having a positive dielectric anisotropy ($\Delta\varepsilon$), the liquid crystal composition having a liquid crystal phase over a wide temperature range, a low viscosity, good solubility at low temperatures, a high specific resistance, and a high voltage holding ratio, and being stable against heat and light. Another object of the present invention is to provide, by using the liquid crystal composition, for example, an IPS-type or TN-type liquid crystal display element which has high display quality and in which display defects such as image sticking and a drop mark do not tend to occur.

Solution to Problem

The inventor of the present invention studied various liquid crystal compounds and various chemical substances and found that the objects can be achieved by combining specific compounds. This finding led to the completion of the present invention.

The present invention provides a nematic liquid crystal composition containing, as a first component, at least one compound represented by general formula (I):

[Chem. 2]

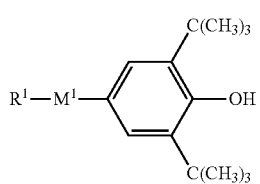

(where $R^1$ represents a linear or branched alkyl group having 1 to 22 carbon atoms and at least one $CH_2$ group in the alkyl group may be substituted with —O—, —CH=CH—, —CO—, —OCO—, —COO—, —C≡C—, —CF$_2$O—, or —OCF$_2$— so that oxygen atoms are not directly adjacent to each other; and $M^1$ represents a trans-1,4-cyclohexylene group, a 1,4-phenylene group, or a single bond), and as a second component, at least one compound selected from the group consisting of compounds represented by general formulae (II-a) to (II-e):

[Chem. 3]

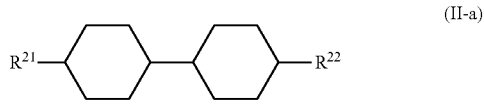

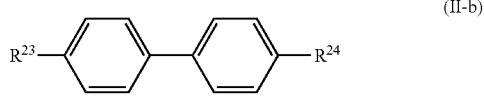

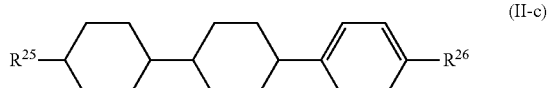

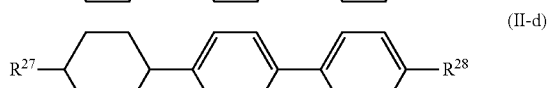

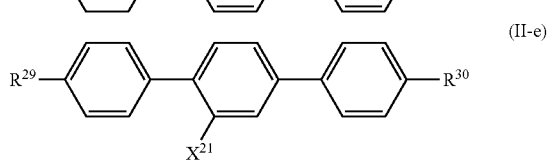

(where $R^{21}$ to $R^{30}$ each independently represent an alkyl group having 1 to 10 carbon atoms or an alkenyl group having 2 to 10 carbon atoms and $X^{21}$ represents a hydrogen atom or a fluorine atom), wherein a dielectric anisotropy ($\Delta\varepsilon$) at 25° C. is +3.5 or more. Furthermore, the present invention provides a liquid crystal display element using the liquid crystal composition.

Advantageous Effects of Invention

According to the liquid crystal composition of the present invention, the liquid crystal composition having a positive $\Delta\varepsilon$, a significantly low viscosity can be achieved, solubility at low temperatures is good, and changes in the specific resistance and the voltage holding ratio due to heat and light are extremely small, and thus products obtained by using the liquid crystal composition can be widely practically used. Liquid crystal display elements, such as IPS-type and fringe field switching (FFS)-type liquid crystal display elements, using the liquid crystal composition are very useful because high-speed response can be achieved and display defects are suppressed.

DESCRIPTION OF EMBODIMENTS

In a liquid crystal composition of the present invention, in a compound used as a first component and represented by general formula (I):

[Chem. 4]

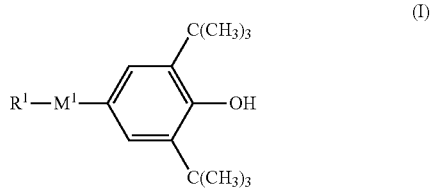

$R^1$ represents a linear or branched alkyl group having 1 to 22 carbon atoms and at least one $CH_2$ group in the alkyl group may be substituted with —O—, —CH=CH—, —CO—, —OCO—, —COO—, —C≡C—, —CF$_2$O—, or —OCF$_2$— so that oxygen atoms are not directly adjacent to each other. Examples of R$^1$ preferably include a linear alkyl group, a linear alkoxy group, a linear alkyl group in which one CH$_2$ group is substituted with —OCO— or —COO—, a branched alkyl group, a branched alkoxy group, and a branched alkyl group in which one CH$_2$ group is substituted with —OCO— or —COO—, all of which have 1 to 10 carbon atoms. Examples of R$^1$ more preferably include a linear alkyl group, a linear alkyl group in which one CH$_2$ group is substituted with —OCO— or —COO—, a branched alkyl group, a branched alkoxy group, and a branched alkyl group in which one CH$_2$ group is substituted with —OCO— or —COO—, all of which have 1 to 20 carbon atoms. M$^1$ represents a trans-1,4-cyclohexylene group, a 1,4-phenylene group, or a single bond. M$^1$ is preferably a trans-1,4-cyclohexylene group or a 1,4-phenylene group.

More specifically, the compound represented by general formula (I) is preferably a compound selected from compounds represented by general formulae (I-a) to (I-d) below.

[Chem. 5]

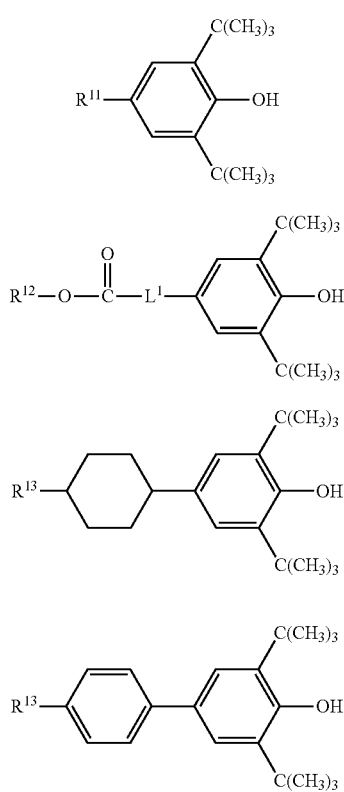

In the above formulae, R$^{11}$ is preferably a linear alkyl group or branched alkyl group having 1 to 10 carbon atoms; R$^{12}$ is preferably a linear alkyl group or branched alkyl group having 1 to 20 carbon atoms, R$^{13}$ is preferably a linear alkyl group, branched alkyl group, linear alkoxy group, or branched alkoxy group having 1 to 8 carbon atoms; and L$^1$ is preferably a linear alkylene group or branched alkylene group having 1 to 8 carbon atoms. Among the compounds represented by general formulae (I-a) to (I-d), the compounds represented by general formulae (I-c) and (I-d) are more preferable.

The liquid crystal composition of the present invention preferably contains one or two compounds represented by general formula (I), and more preferably contains one to five compounds represented by general formula (I). The content thereof is preferably 0.001% to 1% by mass, more preferably 0.001% to 0.1% by mass, and particularly preferably 0.001% to 0.05% by mass.

The liquid crystal composition of the present invention contains, as a second component, at least one compound selected from compounds represented by general formulae (II-a) to (II-e).

[Chem. 6]

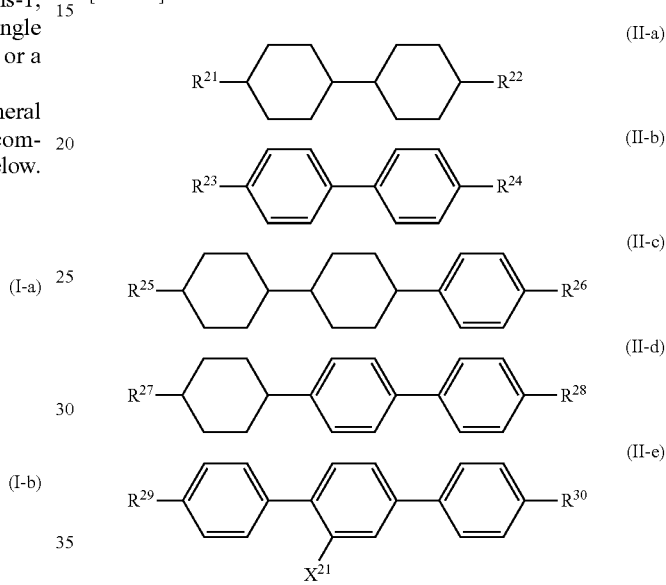

In the above formulae, R$^{21}$ to R$^{30}$ each independently represent an alkyl group having 1 to 10 carbon atoms or an alkenyl group having 2 to 10 carbon atoms. X$^{21}$ represents a hydrogen atom or a fluorine atom. X$^{21}$ is preferably a fluorine atom. One to ten compounds selected from the compound group represented by general formula (II) are preferably contained and one to eight compounds selected from the compound group represented by general formula (II) are particularly preferably contained. The content thereof is 5% to 80% by mass, preferably 10% to 70% by mass, and particularly preferably 20% to 60% by mass.

Preferably, the liquid crystal composition of the present invention further contains, as a third component, at least one compound represented by general formula (III).

[Chem. 7]

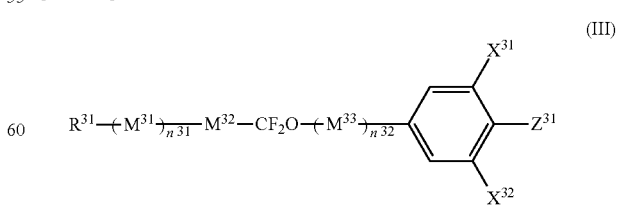

In the compound represented by general formula (III), R$^{31}$ represents an alkyl group or alkoxy group having 1 to 10 carbon atoms, or an alkenyl group or alkenyloxy group having 2 to 10 carbon atoms; $M^{31}$ to $M^{33}$ each independently represent a trans-1,4-cyclohexylene group or a 1,4-phenylene group, one or two —$CH_2$— groups in the trans-1,4-cyclohexylene group may be substituted with —O— so that oxygen atoms are not directly adjacent to each other, and one or two hydrogen atoms in the phenylene group may be substituted with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2; $n^{31}+n^{32}$ represents 0, 1, or 2; and when plural $M^{31}$s and $M^{33}$s are present, they may be the same or different.

More specifically, the compound represented by general formula (III) is preferably a compound selected from compounds represented by general formulae (III-a) to (III-e) below:

[Chem. 8]

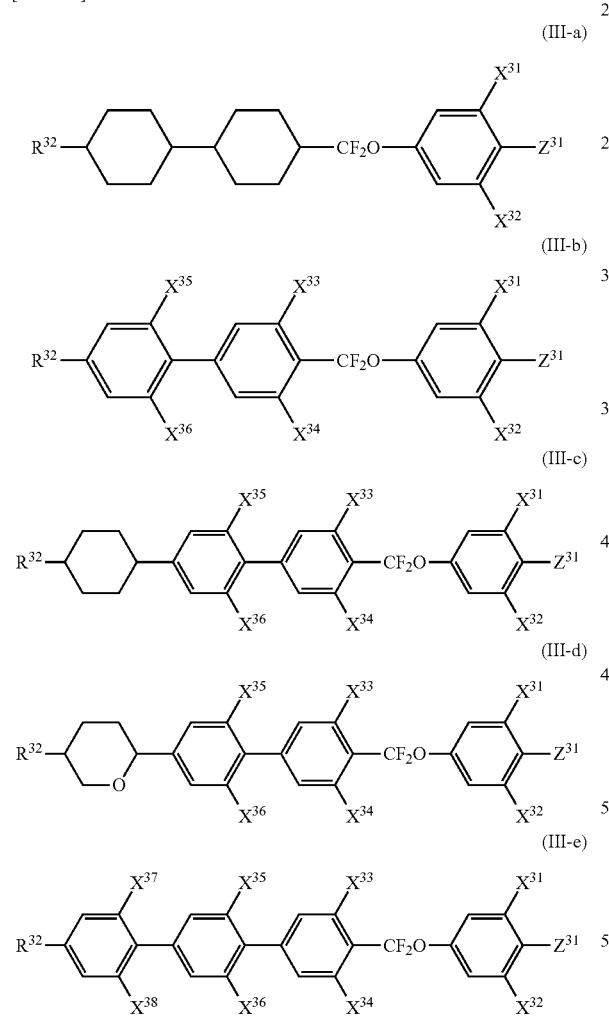

(where $R^{32}$ represents an alkyl group or alkoxy group having 1 to 10 carbon atoms, or an alkenyl group or alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group.)

One to eight compounds selected from the compound group represented by general formula (III) are preferably contained and one to five compounds selected from the compound group represented by general formula (III) are particularly preferably contained. The content thereof is 3% to 50% by mass, and preferably 5% to 40% by mass.

The liquid crystal composition of the present invention may further contain, as a fourth component, at least one compound selected from the compound group represented by general formulae (IV-a) to (IV-f):

[Chem. 9]

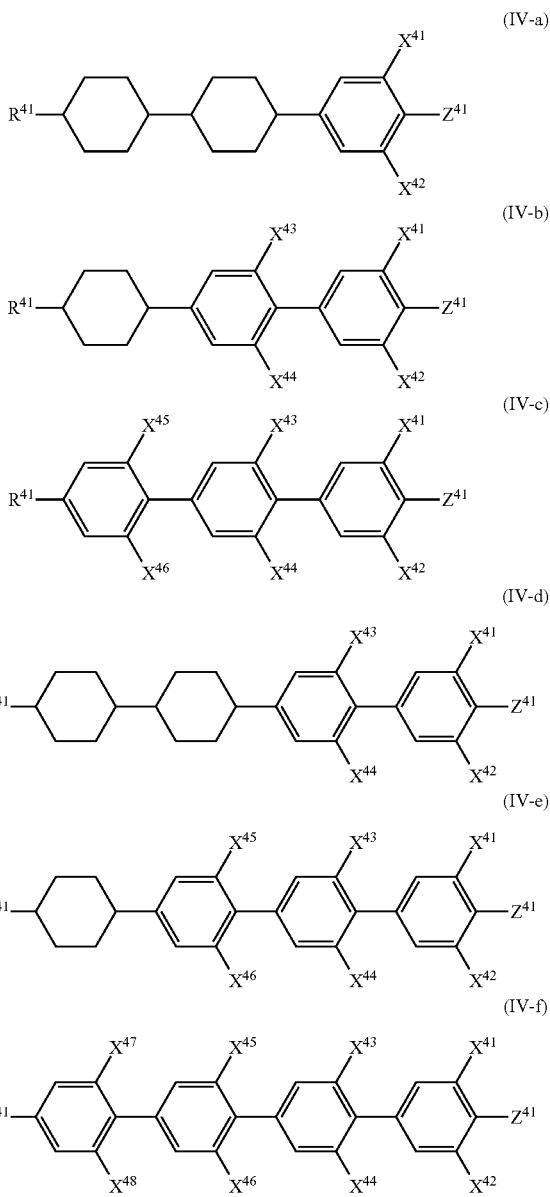

(where $R^{41}$ represents an alkyl group or alkoxy group having 1 to 10 carbon atoms, or an alkenyl group or alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group.) One to ten compounds selected from this compound group are preferably contained and one to eight compounds selected from this compound group are particularly preferably contained. The content thereof is preferably 5% to 50% by mass, and more preferably 10% to 40% by mass.

The liquid crystal composition of the present invention has a dielectric anisotropy ($\Delta\epsilon$) of +3.5 or more at 25° C. The $\Delta\epsilon$ is more preferably +3.5 to +15.0 at 25° C. The liquid crystal composition of the present invention has a birefringence ($\Delta n$) of 0.08 to 0.14 at 25° C. The $\Delta n$ is more preferably 0.09 to 0.13 at 25° C. More specifically, in the case of a small cell gap, the $\Delta n$ is preferably 0.10 to 0.13. In the case of a large cell gap, the $\Delta n$ is preferably 0.08 to 0.10. The liquid crystal composition of the present invention has a viscosity ($\eta$) of 10 to 45 mPa·s, more preferably 10 to 25 mPa·s, and particularly preferably 10 to 20 mPa·s at 20° C. The liquid crystal composition of the present invention has a nematic phase-isotropic liquid phase transition temperature ($T_{ni}$) of 60° C. to 120° C., more preferably 70° C. to 100° C., and particularly preferably 70° C. to 85° C.

The liquid crystal composition of the present invention may contain a common nematic liquid crystal, smectic liquid crystal, cholesteric liquid crystal, and the like in addition to the above compounds.

The liquid crystal composition of the present invention may contain a polymerizable compound in order to produce a liquid crystal display element such as a polymer-stabilized (PS) mode-, lateral electric field-type polymer sustained alignment (PSA) mode-, or lateral electric field-type polymer-stabilized vertical alignment (PSVA)-mode liquid crystal display element. Examples of the polymerizable compound include photopolymerizable monomers that are polymerized by energy rays such as light. In terms of the structure, examples thereof include polymerizable compounds having a liquid crystal skeleton in which plural six-membered rings are linked to each other, for example, biphenyl derivatives and terphenyl derivatives. More specifically, a preferable polymerizable compound is a bifunctional monomer represented by general formula (V):

[Chem. 10]

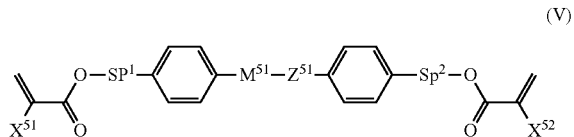

(where $X^{51}$ and $X^{52}$ each independently represent a hydrogen atom or a methyl group;

$Sp^1$ and $Sp^2$ each independently represent a single bond, an alkylene group having 1 to 8 carbon atoms, or —O—$(CH_2)_s$— (where s represents an integer of 2 to 7 and the oxygen atom is bonded to an aromatic ring);

$Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$═CY$^2$— (where Y$^1$ and Y$^2$ each independently represent a fluorine atom or a hydrogen atom), —C≡C—, or a single bond; and $M^{51}$ represents a 1,4-phenylene group, a trans-1,4-cyclohexylene group, or a single bond, and any hydrogen atom in all the 1,4-phenylene groups in the formula may be substituted with a fluorine atom.)

Diacrylate derivatives in which each of $X^{51}$ and $X^{52}$ represents a hydrogen atom and dimethacrylate derivatives in which each of $X^{51}$ and $X^{52}$ represents a methyl group are preferable. Compounds in which one of $X^{51}$ and $X^{52}$ represents a hydrogen atom and the other represents a methyl group are also preferable. Regarding the rate of polymerization of these compounds, the rate of polymerization of the diacrylate derivatives is the highest, the rate of polymerization of the dimethacrylate derivatives is the lowest, and the rate of polymerization of the asymmetric compounds is between that of the diacrylate derivatives and that of the dimethacrylate derivatives. Preferable embodiments can be used in accordance with the use of the compound. In a PSA display element, the dimethacrylate derivatives are particularly preferable.

$Sp^1$ and $Sp^2$ each independently represent a single bond, an alkylene group having 1 to 8 carbon atoms, or —O—$(CH_2)_s$—. In a PSA display element, at least one of $Sp^1$ and $Sp^2$ is preferably a single bond. That is, embodiments in which each of $Sp^1$ and $Sp^2$ represents a single bond or embodiments in which one of $Sp^1$ and $Sp^2$ represents a single bond and the other represents an alkylene group having 1 to 8 carbon atoms or —O—$(CH_2)_s$— are preferable. In such a case, an alkyl group of 1 to 4 is preferable, and s is preferably 1 to 4.

$Z^{51}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

$M^{51}$ represents a 1,4-phenylene group in which any hydrogen atom may be substituted with a fluorine atom, a trans-1,4-cyclohexylene group, or a single bond. $M^{51}$ is preferably a 1,4-phenylene group or a single bond. When C represents a ring structure other than a single bond, $Z^{51}$ may be a linking group other than a single bond. When $M^{51}$ is a single bond, $Z^{51}$ is preferably a single bond.

From the above points, specifically, the ring structure between $Sp^1$ and $Sp^2$ in general formula (V) is preferably selected from the structures described below.

In general formula (V), when $M^{51}$ represents a single bond and the ring structure is formed by two rings, the ring structure represents preferably any one of formulae (Va-1) to (Va-5) below, more preferably any one of formulae (Va-1) to (Va-3), and particularly preferably formula (Va-1).

[Chem. 11]

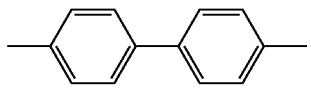
(Va-1)

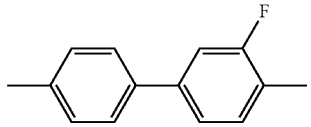
(Va-2)

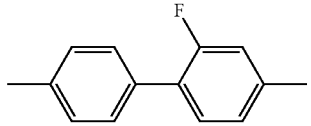
(Va-3)

-continued

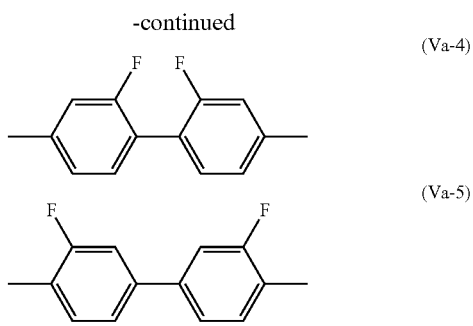

(Va-4)

(Va-5)

(In the above formulae, both ends are bonded to $Sp^1$ and $Sp^2$.)

Polymerizable compounds having any of these skeletons are most suitably used in PSA-type liquid crystal display elements in terms of alignment control force after polymerization, and thus a good alignment state can be obtained by the polymerizable compounds. Accordingly, display unevenness is suppressed or no display unevenness is generated.

Accordingly, polymerizable monomers represented by general formulae (V-1) to (V-4) are particularly preferable. Among these, the polymerizable monomer represented by general formula (V-2) is the most preferable.

[Chem. 12]

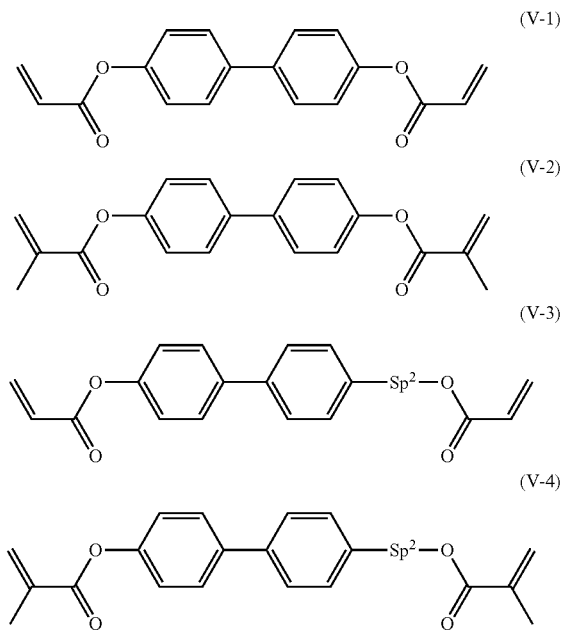

(V-1)

(V-2)

(V-3)

(V-4)

(In the formulae above, $Sp^2$ represents an alkylene group having 2 to 5 carbon atoms.)

In the case where a monomer is added to the liquid crystal composition of the present invention, polymerization proceeds even when no polymerization initiator is present. However, a polymerization initiator may be incorporated in order to accelerate the polymerization. Examples of the polymerization initiator include benzoin ethers, benzophenones, acetophenones, benzyl ketals, and acylphosphine oxides.

To the liquid crystal composition of the present invention, the composition containing a polymerizable compound, a liquid crystal alignment capability is provided by polymerizing the polymerizable compound contained in the liquid crystal composition by irradiation with ultraviolet light. The liquid crystal composition of the present invention is used in a liquid crystal display element in which the amount of transmitted light is controlled by using the birefringence of the liquid crystal composition. The liquid crystal composition of the present invention is useful for various liquid crystal display elements, such as an active-matrix liquid crystal display element (AM-LCD), a twisted nematic liquid crystal display element (TN-LCD), a super-twisted nematic liquid crystal display element (STN-LCD), an optically compensated birefringence liquid crystal display element (OCB-LCD), and an in-plane-switching liquid crystal display element (IPS-LCD). The liquid crystal composition of the present invention is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer can be produced by, for example, sputtering indium tin oxide (ITO) on a transparent substrate such as a glass plate.

A color filter can be produced by, for example, a pigment dispersion method, a printing method, an electrodeposition method, or a staining method. A method for producing a color filter will be described by taking the pigment dispersion method as an example. First, a curable coloring composition for a color filter is applied onto the above-mentioned transparent substrate, and is then patterned. The curable coloring composition is then cured by heating or light irradiation. These steps are performed for each of three colors of red, green, and blue. Thus, pixel portions of the color filter can be formed. Furthermore, pixel electrodes each including an active element such as a TFT, a thin-film diode, or a metal-insulator-metal specific resistance element may be provided on the substrate.

The substrates are arranged so as to face each other such that the transparent electrode layer is disposed inside. In this step, the gap between the substrates may be adjusted with a spacer therebetween. In this case, the gap is preferably adjusted so that the thickness of a light-modulating layer obtained is in the range of 1 to 100 μm, and more preferably 1.5 to 10 μm. When a polarizer is used, it is preferable to adjust the product of the birefringence Δn of the liquid crystal and a cell thickness d so that the maximum contrast is obtained. When two polarizers are provided, the polarizing axis of each of the polarizers may be adjusted so that a satisfactory angle of view and contrast can be obtained. Furthermore, a retardation film for widening the angle of view may also be used. Examples of the spacer include glass particles, plastic particles, alumina particles, and a photoresist material. Subsequently, a sealant such as an epoxy thermosetting composition or the like is applied onto the substrate by screen printing so as to form a liquid-crystal injection port. The substrates are then bonded to each other, and the sealant is thermally cured by heating.

As a method for interposing the polymerizable compound-containing liquid crystal composition between two substrates, a commonly used vacuum injection method, an ODF method, or the like can be employed. In the vacuum injection method, although a drop mark is not generated, this method has a problem in that a mark of injection is left. However, in the present invention, the liquid crystal composition can be suitably used in a display element produced by using the ODF method.

As a method for polymerizing the polymerizable compound, a method in which polymerization is conducted by irradiation with active energy rays such as ultraviolet light and an electron beam, which can be used alone, in combination, or sequentially, is preferable because a moderate rate of polymerization is desirable in order to obtain a good alignment performance of the liquid crystal. In the case where ultraviolet light is used, either a polarized light source or an unpolarized light source may be used. When polymerization is conducted in a state in which the polymerizable compound-containing liquid crystal composition is interposed between two substrates, it is necessary that at least a substrate on the irradiation surface side have transparency appropriate for the active energy rays. Only specific portions may be polymerized using a mask during light irradiation, and unpolymerized portions may then be polymerized by further irradiation with active energy rays while the alignment state of the unpolymerized portions is changed by changing a condition such as the electric field, the magnetic field, the temperature, or the like. In particular, when ultraviolet exposure is performed, the ultraviolet exposure is preferably performed while an alternating electric field is applied to the polymerizable compound-containing liquid crystal composition. Regarding the alternating electric field applied, an alternating current having a frequency of preferably 10 Hz to 10 kHz, and more preferably 60 Hz to 10 kHz is applied, and the voltage applied is selected in accordance with a desired pre-tilt angle of the liquid crystal display element. That is, the pre-tilt angle of the liquid crystal display element can be controlled by controlling the voltage applied. In a liquid crystal display element of the lateral electric field-type multi-domain vertical alignment (MVA) mode, it is preferable to control the pre-tilt angle to 80 to 89.9 degrees from the standpoint of alignment stability and the contrast.

The temperature during the irradiation is preferably within a temperature range in which the liquid crystal state of the liquid crystal composition of the present invention is maintained. Polymerization is preferably conducted at a temperature close to room temperature, that is, typically at a temperature in the range of 15° C. to 35° C. As a lamp for generating ultraviolet light, a metal halide lamp, a high-pressure mercury lamp, an ultrahigh-pressure mercury lamp, or the like can be used. As for the wavelength of ultraviolet light for irradiation, it is preferable to radiate ultraviolet light in a wavelength range which is not included in an absorption wavelength range of the liquid crystal composition. Preferably, part of ultraviolet light is cut off and used, as required. The intensity of ultraviolet light for irradiation is preferably 0.1 mW/cm² to 100 W/cm², and more preferably 2 mW/cm² to 50 W/cm². The amount of energy of the ultraviolet light for irradiation can be appropriately adjusted, and is preferably 10 mJ/cm² to 500 J/cm², and more preferably 100 mJ/cm² to 200 J/cm². During the irradiation of ultraviolet light, the intensity of the ultraviolet light may be changed. The ultraviolet-irradiation time is appropriately selected in accordance with the intensity of the ultraviolet light for irradiation, and is preferably 10 to 3,600 seconds and more preferably 10 to 600 seconds.

The liquid crystal display element using the liquid crystal composition of the present invention is a useful display element which realizes both high-speed response and suppression of display defects. The liquid crystal display element is particularly useful as a liquid crystal display element for active-matrix driving and can be applied to a liquid crystal display element for the VA mode, the PSVA mode, the PSA mode, the IPS mode, or the electrically controlled birefringence (ECB) mode.

EXAMPLES

The present invention will be described in more detail by way of Examples, but the present invention is not limited to these Examples. It should be noted that "%" in compositions of Examples and Comparative Examples described below represents "% by mass".

Characteristics measured in Examples are as follows:

$T_{ni}$: nematic phase-isotropic liquid phase transition temperature (° C.)

$\Delta n$: birefringence at 25° C.

$\Delta \in$: dielectric anisotropy at 25° C.

$\eta$: viscosity at 20° C. (mPa·s)

$\gamma_1$: rotational viscosity at 25° C. (mPa·s)

VHR: voltage holding ratio (%) at 60° C. at a frequency of 60 Hz and an applied voltage of 1 V Image Sticking:

Image sticking of a liquid crystal display element was evaluated as follows. A predetermined fixed pattern was displayed in a display area for 1,000 hours, and a uniform image was then displayed on the full screen. The level of a residual image of the fixed pattern was evaluated by visual observation on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

Drop Mark:

A drop mark of a liquid crystal display element was evaluated as follows. When a black color was displayed on the full screen, a drop mark appearing as a white portion was evaluated by visual observation on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In the description of compounds in Examples, the abbreviations below are used.

(Ring Structure)

[Chem. 13]

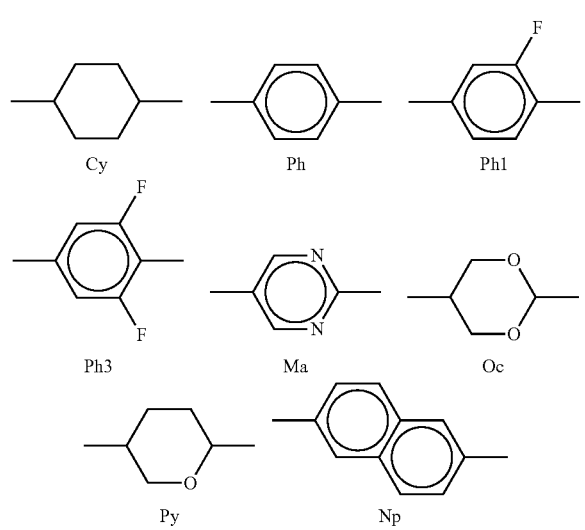

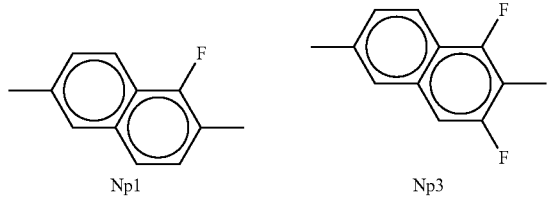

Np1    Np3

(Side Chain Structure and Linking Structure)

TABLE 1

| n (number) at end | $C_nH_{2n+1}-$ |
|---|---|
| -2- | $-CH_2Ch_2-$ |
| -10- | $-CH_2O-$ |
| -01- | $-OCH_2-$ |
| —V— | —CO— |
| —VO— | —COO— |

TABLE 1-continued

| n (number) at end | $C_nH_{2n+1}-$ |
|---|---|
| —CFFO— | $-CF_2O-$ |
| —F | —F |
| —Cl | —Cl |
| —CN | —C≡N |
| —OCFFF | $-OCF_3$ |
| —CFFF | $-CF_3$ |
| -On | $-OC_nH_{2n+1}$ |
| -T- | —C≡C— |
| ndm- | $C_nH_{2n+1}-HC=CH-(CH_2)_{m-1}-$ |
| -ndm | $-(CH_2)_{n-1}-HC=CH-C_mH_{2m+1}$ |
| ndmO— | $C_nH_{2n+1}-HC=CH-(CH_2)_{m-1}O-$ |
| —Ondm | $-O-(CH_2)_{n-1}-HC=CH-C_mH_{2m+1}$ |
| -ndm- | $-(CH_2)_{n-1}-HC=CH-(CH_2)_{m-1}-$ |

Example 1

A liquid crystal composition LC-1 shown below was prepared.

[Chem. 14]

| Chemical structure | Ratio | Abbreviation |
|---|---|---|
| | 48% | 3-Cy-Cy-1d0 |
| | 4% | 3-Cy-Cy-1d1 |
| | 8% | 1-Ph—Ph-3d1 |
| | 5% | 3-Cy-Ph—Ph-2 |
| | 5% | 2-Ph—Ph1—Ph-3 |
| | 2% | 3-Ph—Ph3—CFFO—Ph3—F |
| | 3% | 3-Cy-Cy-CFFO—Ph3—F |

-continued

[Chem. 14]

| Chemical structure | Ratio | Abbreviation |
|---|---|---|
| 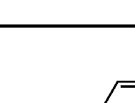 | 7% | 3-Ph—Ph1—Ph3—CFFO—Ph3—F |
| 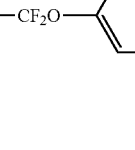 | 5% | 4-Cy-Cy-Ph3—CFFO—Ph3—F |

The values of the physical properties of LC-1 were as follows.

TABLE 2

| $T_{NI}/°C.$ | 75.8 |
|---|---|
| $\Delta n$ | 0.112 |
| no | 1.488 |
| $\epsilon_\perp$ | 5.5 |
| $\Delta\epsilon$ | 2.9 |
| $\eta/mPa \cdot s$ | 13.5 |

A liquid crystal composition LCM-1 was prepared by adding 0.03% of a compound represented by formula (I-c-1):

[Chem. 15]

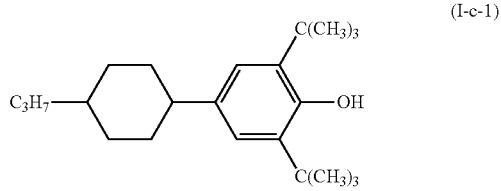

(I-c-1)

to 99.97% of the liquid crystal composition LC-1. The values of the physical properties of LCM-1 were substantially the same as those of LC-1. The initial VHR of the liquid crystal composition LCM-1 was 99.3%, whereas the VHR after the composition LCM-1 was left to stand at a high temperature of 150° C. for one hour was 98.9%. An in-plane-switching (IPS) liquid crystal display element was prepared by using the liquid crystal composition LCM-1, and image sticking and a drop mark of the liquid crystal display element were evaluated by the methods described above. Good results were obtained as shown below.

TABLE 3

| Evaluation of drop mark | A |
|---|---|
| Evaluation of image sticking | A |

Comparative Example 1

The liquid crystal composition LC-1, to which the compound represented by formula (I-c-1) described in Example 1 was not added, had an initial VHR of 99.5%. In contrast, the VHR after the composition LC-1 was left to stand at a high temperature of 150° C. for one hour was 87.2%, which was significantly decreased from the initial VHR.

A vertical alignment (VA) liquid crystal display element was prepared by using the liquid crystal composition LC-1, and image sticking and a drop mark of the liquid crystal display element were evaluated by the methods described above. Results inferior to those of Example 1 were obtained as shown below.

TABLE 4

| Evaluation of drop mark | C |
|---|---|
| Evaluation of image sticking | D |

Comparative Example 2

A liquid crystal composition LC-2 that did not contain a compound represented by general formula (II), the composition LC-2 being shown below, was prepared.

[Chem. 16]

| Chemical structure | Ratio | Abbreviation |
|---|---|---|
| 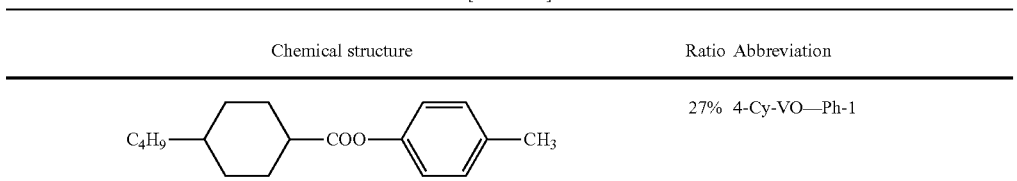 | 27% | 4-Cy-VO—Ph-1 |

-continued

[Chem. 16]

| Chemical structure | Ratio | Abbreviation |
|---|---|---|
| 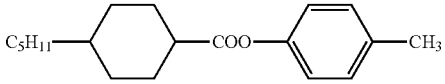 | 20% | 5-Cy-VO—Ph-1 |
| 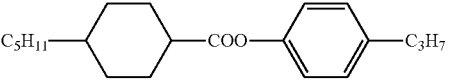 | 20% | 5-Cy-VO—Ph-3 |
| 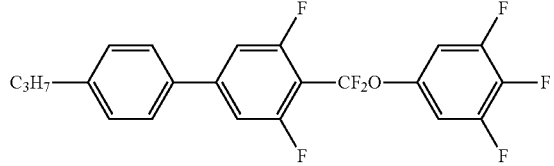 | 8% | 3-Ph—Ph3—CFFO—Ph3—F |
| 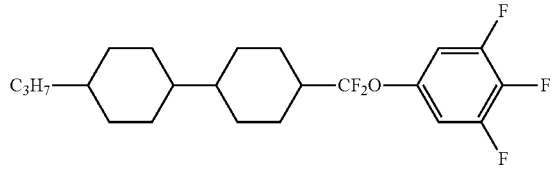 | 13% | 3-Cy-Cy-CFFO—Ph3—F |
| 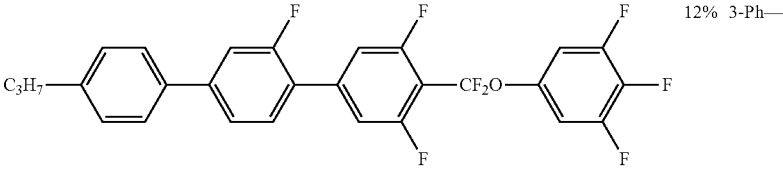 | 12% | 3-Ph—Ph1—Ph3—CFFO—Ph3—F |

The values of the physical properties of LC-2 were as follows.

TABLE 5

| | |
|---|---|
| $T_{NI}/°$ C. | 69.3 |
| $\Delta n$ | 0.096 |
| no | 1.484 |
| $\epsilon_\perp$ | 5.5 |
| $\Delta\epsilon$ | 4.8 |
| $\eta/mPa \cdot s$ | 30.3 |

A liquid crystal composition LCM-A was prepared by adding 0.03% of the compound represented by formula (I-c-1) to 99.97% of the liquid crystal composition LC-A. The values of the physical properties of LCM-A were substantially the same as those of LC-A. The results showed that the liquid crystal composition LCM-A, which did not contain a compound represented by general formula (II), had a viscosity $\eta$ significantly higher than that of the liquid crystal composition LCM-1, which contained a compound represented by general formula (II). The initial VHR of the liquid crystal composition LCM-A was 92.3%, whereas the VHR after the composition LCM-A was left to stand at a high temperature of 150° C. for one hour was 67.4%.

An IPS liquid crystal display element was prepared by using the liquid crystal composition LCM-A, and image sticking and a drop mark of the liquid crystal display element were evaluated by the methods described above. Results inferior to those of Example 1 were obtained as shown below.

TABLE 6

| | |
|---|---|
| Evaluation of drop mark | D |
| Evaluation of image sticking | D |

Examples 2 to 4

Liquid crystal compositions LC-2 to LC-4 shown below were prepared, and the values of the physical properties of LC-2 to LC-4 were measured. The results are shown in the table below.

TABLE 7

| | | | | | |
|---|---|---|---|---|---|
| $T_{NI}/°$ C. | 101 | $T_{NI}/°$ C. | 100.7 | $T_{NI}/°$ C. | 103.2 |
| $\Delta n$ | 0.095 | $\Delta n$ | 0.094 | $\Delta n$ | 0.102 |
| $\Delta\epsilon$ | 8.2 | $\Delta\epsilon$ | 8.0 | $\Delta\epsilon$ | 7.1 |
| $\eta/mPa \cdot s$ | 23.6 | $\eta/mPa \cdot s$ | 22.2 | $\eta/mPa \cdot s$ | 20.8 |
| $\gamma_1/mPa \cdot s$ | 115 | $\gamma_1/mPa \cdot s$ | 108 | $\gamma_1/mPa \cdot s$ | 96 |
| 4-Cy-Cy-1d0 | 15% | 4-Cy-Cy-1d0 | 15% | 5-Cy-Cy-1d0 | 5% |
| 0d1-Cy-Cy-Ph-1 | 4% | 0d1-Cy-Cy-Ph-1 | 4% | 3-Cy-Cy-1d1 | 10% |

TABLE 7-continued

| | | | | | |
|---|---|---|---|---|---|
| 0d3-Cy-Cy-Ph-1 | 14% | 0d3-Cy-Cy-Ph-1 | 14% | 0d1-Cy-Cy-Ph-1 | 8% |
| 3-Cy-Ph—Ph-Cy-3 | 3% | 3-Cy-Ph—Ph-Cy-3 | 3% | 5-Cy-Cy-Ph—O1 | 6% |
| 3-Cy-Ph—Ph1-Cy-3 | 4% | 3-Cy-Ph—Ph1-Cy-3 | 4% | 2-Ph—Ph1—Ph-3 | 8% |
| 1-Cy-Cy-Ph3—F | 9% | 1-Cy-Cy-Ph3—F | 9% | 2-Cy-Cy-Ph3—F | 11% |
| 2-Cy-Cy-Ph3—F | 10% | 2-Cy-Cy-Ph3—F | 10% | 3-Cy-Cy-Ph3—F | 15% |
| 3-Cy-Cy-Ph3—F | 10% | 3-Cy-Cy-Ph3—F | 10% | 5-Cy-Cy-Ph3—F | 5% |
| 5-Cy-Cy-Ph3—F | 5% | 5-Cy-Cy-Ph3—F | 5% | 3-Cy-Ph—Ph3—F | 6% |
| 3-Cy-Ph1—Ph3—F | 8% | 0d1-Cy-Cy-Ph1—F | 8% | 3-Cy-Ph—Ph1—F | 9% |
| 5-Cy-Ph1—Ph3—F | 7% | 3-Cy-Cy-Ph1—Ph3—F | 8% | 4-Cy-Cy-Ph—OCFFF | 4% |
| 3-Ph—Ph1—Ph3—F | 3% | 2-Ph—Ph3—CFFO—Ph3—F | 4% | 3-Cy-Cy-CFFO—Ph3—F | 7% |
| 3-Cy-Cy-Ph1—Ph3—F | 8% | 3-Ph—Ph3—CFFO—Ph3—F | 6% | 5-Cy-Cy-CFFO—Ph3—F | 4% |
| | | | | 3-Cy-Cy-Ph1—Ph3—F | 2% |

Liquid crystal compositions LCM-2 to LCM-4 were respectively prepared by adding 0.03% of the compound represented by formula (I-c-1) to 99.97% of the liquid crystal compositions LC-2 to LC-4. The values of the physical properties of LCM-2 to LCM-4 were substantially the same as those before the addition of the compound.

The initial VHR of each of the liquid crystal compositions LCM-2 to LCM-4 was substantially the same as the VHR after the composition was left to stand at a high temperature of 150° C. for one hour. IPS liquid crystal display elements were prepared by using the liquid crystal compositions LCM-2 to LCM-4, and image sticking and a drop mark of each of the liquid crystal display elements were evaluated. Good results were obtained as shown below.

TABLE 8

| | LCM-2 | LCM-3 | LCM-4 |
|---|---|---|---|
| Initial VHR (%) | 98.6 | 98.6 | 98.5 |
| VHR (%) after 1 hour at 150° C. | 98.2 | 98.3 | 98.1 |
| Evaluation of drop mark | A | A | A |
| Evaluation of image sticking | A | A | A |

Examples 5 to 7

Liquid crystal compositions LC-5 to LC-7 shown below were prepared, and the values of the physical properties of LC-5 to LC-7 were measured. The results are shown in the table below.

Liquid crystal compositions LCM-5 to LCM-7 were respectively prepared by adding 0.03% of the compound represented by formula (I-c-1) to 99.97% of the liquid crystal compositions LC-5 to LC-7. The values of the physical properties of LCM-5 to LCM-7 were substantially the same as those before the addition of the compound.

The initial VHR of each of the liquid crystal compositions LCM-5 to LCM-7 was substantially the same as the VHR after the composition was left to stand at a high temperature of 150° C. for one hour. IPS liquid crystal display elements were prepared by using the liquid crystal compositions LCM-5 to LCM-7, and image sticking and a drop mark of each of the liquid crystal display elements were evaluated. Good results were obtained as shown below.

TABLE 10

| | LCM-5 | LCM-6 | LCM-7 |
|---|---|---|---|
| Initial VHR (%) | 98.4 | 98.5 | 98.4 |
| VHR (%) after 1 hour at 150° C. | 98.1 | 98.3 | 98.0 |
| Evaluation of drop mark | A | A | A |
| Evaluation of image sticking | A | A | A |

Examples 8 to 10

Liquid crystal compositions LC-8 to LC-10 shown below were prepared, and the values of the physical properties of LC-8 to LC-10 were measured. The results are shown in the table below.

TABLE 9

| | | | | | |
|---|---|---|---|---|---|
| $T_{NI}$/° C. | 90.2 | $T_{NI}$/° C. | 110 | $T_{NI}$/° C. | 77.4 |
| Δn | 0.098 | Δn | 0.0990 | Δn | 0.1010 |
| Δε | 9.1 | Δε | 8.3 | Δε | 7.0 |
| η/mPa·s | 18.1 | η/mPa·s | 23.4 | η/mPa·s | 14.2 |
| $γ_1$/mPa·s | 90 | $γ_1$/mPa·s | 112 | $γ_1$/mPa·s | 86 |
| 5-Cy-Cy-1d0 | 15% | 5-Cy-Cy-1d0 | 10% | 5-Cy-Cy-1d0 | 12% |
| 3-Cy-Cy-1d1 | 2% | 3-Cy-Cy-1d1 | 5% | 3-Cy-Cy-1d0 | 25% |
| 0d1-Cy-Cy-Ph-1 | 12% | 0d1-Cy-Cy-Ph-1 | 8% | 3-Cy-Cy-1d1 | 12% |
| 2-Ph—Ph1—Ph-3 | 3% | 0d3-Cy-Cy-Ph-1 | 12% | 0d1-Cy-Cy-Ph-1 | 4% |
| 2-Ph—Ph1—Ph-4 | 3% | 2-Ph—Ph1—Ph-5 | 2% | 0d3-Cy-Cy-Ph-1 | 9% |
| 2-Cy-Cy-Ph3—F | 8% | 3-Cy-Ph—Ph-Cy-3 | 3% | 2-Ph—Ph1—Ph3—F | 5% |
| 2-Cy-Ph—Ph3—F | 3% | 3-Cy-Ph—Ph1-Cy-3 | 3% | 3-Ph—Ph1—Ph3—F | 9% |
| 3-Cy-Ph—Ph3—F | 9% | 1-Cy-Cy-Ph3—F | 9% | 2-Ph—Ph3—CFFO—Ph3—F | 4% |
| 4-Cy-Cy-Ph—OCFFF | 14% | 2-Cy-Cy-Ph3—F | 10% | 3-Ph—Ph3—CFFO—Ph3—F | 6% |
| 3-Ph—Ph3—CFFO—Ph3—F | 11% | 3-Cy-Cy-Ph3—F | 6% | 3-Cy-Cy-CFFO—Ph3—F | 2% |
| 2-Cy-Cy-CFFO—Ph3—F | 9% | 5-Cy-Cy-Ph3—F | 5% | 5-Cy-Cy-CFFO—Ph3—F | 3% |
| 3-Cy-Cy-CFFO—Ph3—F | 8% | 0d1-Cy-Cy-Ph1—F | 8% | 3-Cy-Cy-Ph1—Ph3—F | 9% |
| 3-Cy-Cy-Ph1—Ph3—F | 3% | 2-Ph—Ph3—CFFO—Ph3—F | 4% | | |
| | | 3-Ph—Ph3—CFFO—Ph3—F | 6% | | |
| | | 3-Cy-Cy-Ph1—Ph3—F | 9% | | |

TABLE 11

| | | | | | |
|---|---|---|---|---|---|
| $T_{NI}/°C$ | 76.0 | $T_{NI}/°C$ | 81.8 | $T_{NI}/°C$ | 75.0 |
| $\Delta n$ | 0.097 | $\Delta n$ | 0.099 | $\Delta n$ | 0.112 |
| $\Delta \epsilon$ | 6.8 | $\Delta \epsilon$ | 8.0 | $\Delta \epsilon$ | 8.7 |
| $\eta/mPa \cdot s$ | 14.5 | $\eta/mPa \cdot s$ | 14.6 | $\eta/mPa \cdot s$ | 15.2 |
| $\gamma_1/mPa \cdot s$ | 83 | $\gamma_1/mPa \cdot s$ | 83 | $\gamma_1/mPa \cdot s$ | 87 |
| 3-Cy-Cy-1d0 | 38% | 3-Cy-Cy-1d0 | 38% | 3-Cy-Cy-1d0 | 30% |
| 3-Cy-Cy-1d1 | 9% | 3-Cy-Cy-1d1 | 14% | 3-Cy-Cy-1d1 | 17% |
| 0d1-Cy-Cy-Ph-1 | 16% | 0d3-Cy-Cy-Ph-1 | 8% | 0d1-Cy-Cy-Ph-1 | 7% |
| 0d3-Cy-Cy-Ph-1 | 4% | 3-Ph—Ph3—CFFO—Ph3—F | 9% | 0d3-Cy-Cy-Ph-1 | 7% |
| 2-Ph—Ph3—CFFO—Ph3—F | 2% | 3-Cy-Cy-CFFO—Ph3—F | 15% | 3-Cy-Cy-Ph-2 | 2% |
| 3-Ph—Ph3—CFFO—Ph3—F | 12% | 3-Ph—Ph1—Ph3—CFFO—Ph3—F | 2% | 2-Ph—Ph1—Ph-4 | 2% |
| 3-Cy-Cy-CFFO—Ph3—F | 7% | 4-Ph—Ph1—Ph3—CFFO—Ph3—F | 7% | 2-Ph—Ph1—Ph3—F | 8% |
| 3-Ph—Ph—Ph1—Ph3—F | 1% | 5-Ph—Ph1—Ph3—CFFO—Ph3—F | 7% | 3-Ph—Ph1—Ph3—F | 12% |
| 3-Ph—Ph1—Ph3—CFFO—Ph3—F | 2% | | | 3-Ph—Ph3—Ph3—F | 4% |
| 2-Py-Ph—Ph3—CFFO—Ph3—F | 3% | | | 3-Cy-Cy-Ph1—CFFO—Ph3—F | 11% |
| 2-Py-Ph—Ph3—CFFO—Ph3—F | 6% | | | | |

Liquid crystal compositions LCM-8 to LCM-10 were respectively prepared by adding 0.03% of the compound represented by formula (I-c-1) to 99.97% of the liquid crystal compositions LC-8 to LC-10. The values of the physical properties of LCM-8 to LCM-10 were substantially the same as those before the addition of the compound.

The initial VHR of each of the liquid crystal compositions LCM-8 to LCM-10 was substantially the same as the VHR after the composition was left to stand at a high temperature of 150° C. for one hour. IPS liquid crystal display elements were prepared by using the liquid crystal compositions LCM-8 to LCM-10, and image sticking and a drop mark of each of the liquid crystal display elements were evaluated. Good results were obtained as shown below.

TABLE 12

| | LCM-8 | LCM-9 | LCM-10 |
|---|---|---|---|
| Initial VHR (%) | 98.5 | 98.6 | 98.6 |
| VHR (%) after 1 hour at 150° C. | 98.2 | 98.3 | 98.2 |
| Evaluation of drop mark | A | A | A |
| Evaluation of image sticking | A | A | A |

Liquid crystal compositions LCM-11 to LCM-13 were respectively prepared by adding 0.03% of the compound represented by formula (I-c-1) to 99.97% of the liquid crystal compositions LC-11 to LC-13. The values of the physical properties of LCM-11 to LCM-13 were substantially the same as those before the addition of the compound.

The initial VHR of each of the liquid crystal compositions LCM-11 to LCM-13 was substantially the same as the VHR after the composition was left to stand at a high temperature of 150° C. for one hour. IPS liquid crystal display elements were prepared by using the liquid crystal compositions LCM-11 to LCM-13, and image sticking and a drop mark of each of the liquid crystal display elements were evaluated. Good results were obtained as shown below.

TABLE 14

| | LCM-11 | LCM-12 | LCM-13 |
|---|---|---|---|
| Initial VHR (%) | 98.7 | 98.6 | 98.8 |
| VHR (%) after 1 hour at 150° C. | 98.4 | 98.4 | 98.5 |
| Evaluation of drop mark | A | A | A |
| Evaluation of image sticking | A | A | A |

Examples 11 to 13

Liquid crystal compositions LC-11 to LC-13 shown below were prepared, and the values of the physical properties of LC-11 to LC-13 were measured. The results are shown in the table below.

Examples 14 to 16

Liquid crystal compositions LC-14 to LC-16 shown below were prepared, and the values of the physical properties of LC-14 to LC-16 were measured. The results are shown in the table below.

TABLE 13

| | | | | | |
|---|---|---|---|---|---|
| $T_{NI}/°C$ | 76.0 | $T_{NI}/°C$ | 77.2 | $T_{NI}/°C$ | 77.9 |
| $\Delta n$ | 0.114 | $\Delta n$ | 0.135 | $\Delta n$ | 0.131 |
| $\Delta \epsilon$ | 6.0 | $\Delta \epsilon$ | 4.5 | $\Delta \epsilon$ | 4.6 |
| $\eta/mPa \cdot s$ | 13.3 | $\eta/mPa \cdot s$ | 10.5 | $\eta/mPa \cdot s$ | 12.4 |
| $\gamma_1/mPa \cdot s$ | 77 | $\gamma_1/mPa \cdot s$ | 57 | $\gamma_1/mPa \cdot s$ | 74 |
| 3-Cy-Cy-1d0 | 39% | 2-Cy-Cy-1d0 | 32% | 3-Cy-Cy-1d0 | 44% |
| 3-Cy-Cy-1d1 | 7% | 0d1-Cy-Cy-Ph-1 | 4% | 3-Cy-Cy-1d1 | 3% |
| 0d1-Cy-Cy-Ph-1 | 11% | 2-Ph—Ph1—Ph-3 | 10% | 2-Ph—Ph-3d1 | 13% |
| 2-Ph—Ph1—Ph-3 | 8% | 2-Ph—Ph1—Ph-5 | 11% | 3-Cy-Ph—Ph-2 | 7% |
| 2-Ph—Ph1—Ph-5 | 8% | 3-Ph—Ph1—Ph-5 | 7% | 2-Ph—Ph1—Ph-3 | 8% |
| 3-Ph—Ph3—CFFO—Ph3—F | 10% | 2-Cy-Cy-Ph—F | 6% | 3-Ph—Ph1—Ph-3 | 7% |
| 3-Cy-Cy-Ph—Ph3—F | 6% | 3-Cy-Cy-Ph—F | 21% | 3-Ph—Ph1—Ph3—CFFO—Ph3—F | 9% |
| 4-Ph—Ph1—Ph3—CFFO—Ph3—F | 11% | 5-Cy-Ph—Ph—F | 7% | 4-Cy-Cy-Ph1—CFFO—Ph3—F | 3% |
| | | 3-Cy-Ph—Ph3—F | 2% | 3-Cy-Ph3—Ph1—OCFFF | 6% |

TABLE 15

| | | | | | |
|---|---|---|---|---|---|
| $T_{NI}/°C$ | 80.6 | $T_{NI}/°C$ | 74.9 | $T_{NI}/°C$ | 80.0 |
| Δn | 0.122 | Δn | 0.121 | Δn | 0.110 |
| Δε | 6.0 | Δε | 4.1 | Δε | 5.9 |
| η/mPa·s | 11.1 | η/mPa·s | 10.8 | η/mPa·s | 11.6 |
| $γ_1$/mPa·s | 65 | $γ_1$/mPa·s | 60 | $γ_1$/mPa·s | 68 |
| 3-Cy-Cy-1d0 | 47% | 3-Cy-Cy-1d0 | 29% | 3-Cy-Cy-1d0 | 10% |
| 3-Cy-Cy-1d1 | 9% | 5-Cy-Cy-0d1 | 8% | 3-Cy-Cy-1d1 | 6% |
| 3-Cy-Cy-Ph-2 | 7% | 3-Cy-Cy-1d1 | 13% | 3-Cy-Cy-1d1-F | 28% |
| 2-Ph—Ph1—Ph-3 | 4% | 5-Ph—Ph-1 | 2% | 0d1-Cy-Cy-Ph-1 | 11% |
| 2-Ph—Ph1—Ph-5 | 7% | 2-Ph—Ph1—Ph-3 | 6% | 0d3-Cy-Cy-Ph-1 | 10% |
| 3-Cy-Ph—Ph-Cy-3 | 2% | 2-Ph—Ph1—Ph-4 | 6% | 2-Ph—Ph1—Ph-3 | 10% |
| 2-Ph—Ph1—Ph-3 | 6% | 2-Ph—Ph1—Ph-5 | 6% | 2-Ph—Ph1—Ph-5 | 10% |
| 3-Ph—Ph1—Ph-3 | 7% | 3-Cy-Ph—Ph-Cy-3 | 4% | 5-Cy-Ph—Ph1—Ph-2 | 2% |
| 3-Ph—Ph3—CFFO—Ph3—F | 2% | 3-Ph—Ph1—Ph3—F | 9% | 3-Ph—Ph3—CFFO—Ph3—F | 7% |
| 3-Cy-Cy-Ph1—Ph3—F | 2% | 2-Ph—Ph3—Ph3—F | 7% | 3-Cy-Cy-Ph1—CFFO—Ph3—F | 6% |
| 3-Cy-Ph—Ph3—Ph1—OCFFF | 7% | 3-Ph—Ph3—CFFO—Ph3—F | 4% | | |
| | | 3-Cy-Ph—Cl | 3% | | |
| | | 3-Cy-Cy-Ph1—Ph3—F | 3% | | |

Liquid crystal compositions LCM-14 to LCM-16 were respectively prepared by adding 0.03% of the compound represented by formula (I-c-1) to 99.97% of the liquid crystal compositions LC-14 to LC-16. The values of the physical properties of LCM-14 to LCM-16 were substantially the same as those before the addition of the compound.

The initial VHR of each of the liquid crystal compositions LCM-14 to LCM-16 was substantially the same as the VHR after the composition was left to stand at a high temperature of 150° C. for one hour. IPS liquid crystal display elements were prepared by using the liquid crystal compositions LCM-14 to LCM-16, and image sticking and a drop mark of each of the liquid crystal display elements were evaluated. Good results were obtained as shown below.

TABLE 16

| | LCM-14 | LCM-15 | LCM-16 |
|---|---|---|---|
| Initial VHR (%) | 98.9 | 98.7 | 98.9 |
| VHR (%) after 1 hour at 150° C. | 98.6 | 98.4 | 98.5 |
| Evaluation of drop mark | A | A | A |
| Evaluation of image sticking | A | A | A |

Example 17

A polymerizable liquid crystal composition CLCM-1 was prepared by adding 0.3% of a polymerizable compound represented by formula (IV-b):

[Chem. 17]

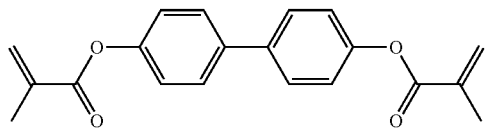

to 99.7% of the nematic liquid crystal composition LCM-1 described in Example 1, and uniformly dissolving the polymerizable compound. The values of the physical properties of CLCM-1 were substantially the same as those of the nematic liquid crystal composition described in Example 1. The CLCM-2 was injected, by a vacuum injection method, into a cell with ITO, the cell having a cell gap of 3.5 μm and including polyimide alignment layers that induced homogeneous alignment. The liquid crystal cell was then irradiated with ultraviolet light using a high-pressure mercury lamp through a filter that cut ultraviolet light of 320 nm or less while a square wave at a frequency of 1 kHz was applied to the cell. The irradiation intensity on the surface of the cell was adjusted to 10 mW/cm², and the irradiation was performed for 600 seconds, thus fabricating a horizontal-alignment liquid crystal display element in which the polymerizable compound in the polymerizable liquid crystal composition was polymerized. It was confirmed that a force to control the alignment of the liquid crystal compound was generated by the polymerization of the polymerizable compound.

The invention claimed is:

1. A nematic liquid crystal composition comprising:
    as a first component, at least one compound represented by general formula (I):

[Chem. 1]

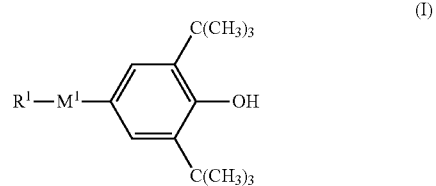

where $R^1$ represents a linear or branched alkyl group having 1 to 22 carbon atoms and one $CH_2$ group in the alkyl group may be substituted with —O—; and $M^1$ represents a trans-1,4-cyclohexylene group; and as a second component, at least one compound selected from the group consisting of compounds represented by general formulae (II-a) to (II-e):

[Chem. 2]

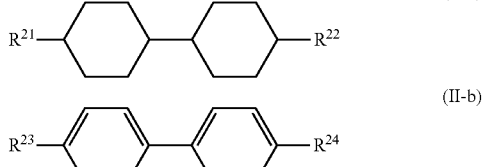

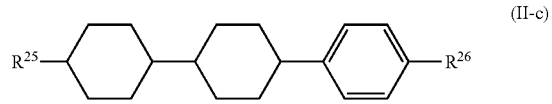

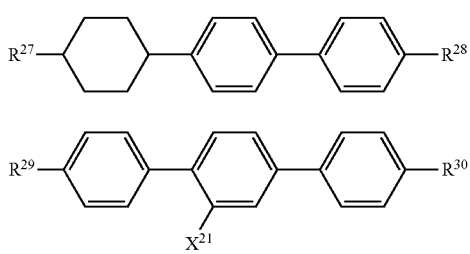

(II-d)

(II-e)

where $R^{21}$ to $R^{30}$ each independently represent an alkyl group having 1 to 10 carbon atoms or an alkenyl group having 2 to 10 carbon atoms and $X^{21}$ represents a hydrogen atom or a fluorine atom, wherein a dielectric anisotropy ($\Delta\epsilon$) at 25° C. is +3.5 or more.

2. The nematic liquid crystal composition according to claim 1, further comprising, as a third component, at least one compound represented by general formula (III):

[Chem. 3]

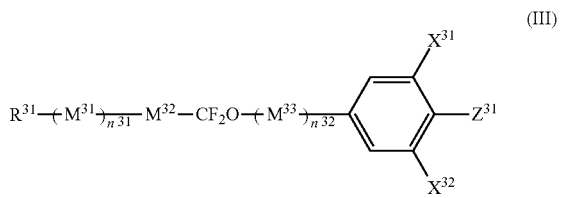

(III)

where $R^{31}$ represents an alkyl group or alkoxy group having 1 to 10 carbon atoms, or an alkenyl group or alkenyloxy group having 2 to 10 carbon atoms; $M^{31}$ to $M^{33}$ each independently represent a trans-1,4-cyclohexylene group or a 1,4-phenylene group, one or two —CH2- groups in the trans-1,4-cyclohexylene group may be substituted with —O— so that oxygen atoms are not directly adjacent to each other, and one or two hydrogen atoms in the phenylene group may be substituted with a fluorine atom; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2; $n^{31}+n^{32}$ represents 0, 1, or 2; and when plural $M^{31}$s and $M^{33}$s are present, they may be the same or different.

3. The nematic liquid crystal composition according to claim 2, wherein general formula (III) is represented by any one of general formulae (III-a) to (III-e):

[Chem. 4]

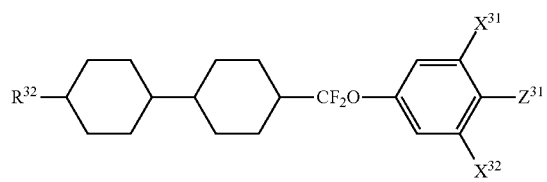

(III-a)

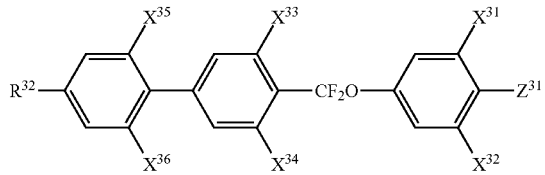

(III-b)

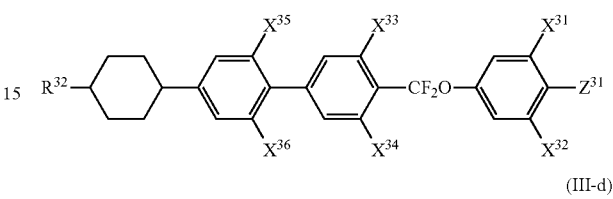

(III-c)

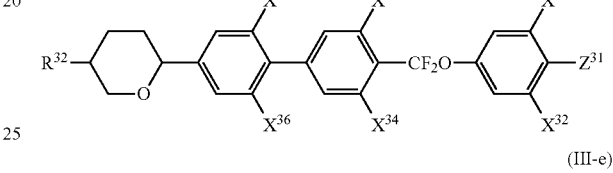

(III-d)

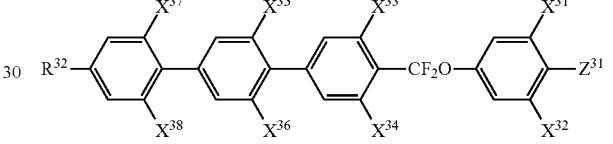

(III-e)

where $R^{32}$ represents an alkyl group or alkoxy group having 1 to 10 carbon atoms, or an alkenyl group or alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group.

4. The nematic liquid crystal composition according to claim 3, further comprising at least one compound selected from the group consisting of compounds represented by general formulae (IV-a) to (IV-f):

[Chem. 5]

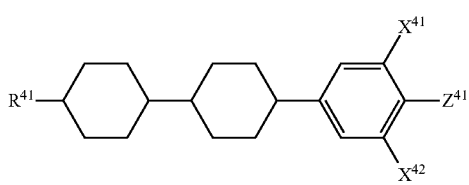

(IV-a)

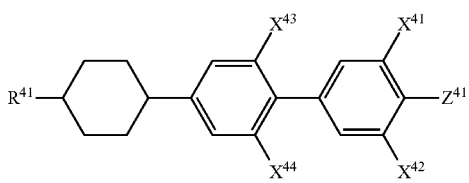

(IV-b)

-continued (IV-c)
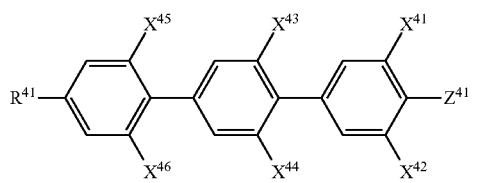

(IV-d)
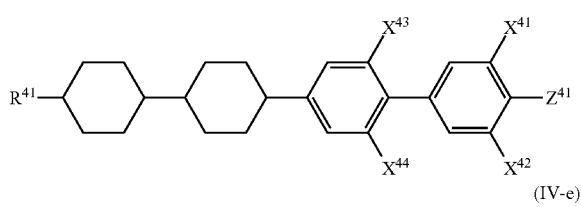

(IV-e)
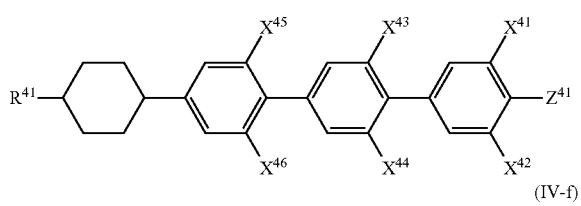

(IV-f)
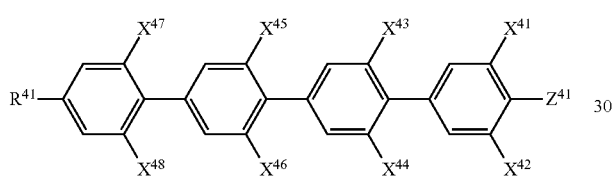

where $R^{41}$ represents an alkyl group or alkoxy group having 1 to 10 carbon atoms, or an alkenyl group or alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group.

5. The nematic liquid crystal composition according to claim 4, wherein, in general formula (I), $R^1$ represents a linear or branched alkyl group having 1 to 10 carbon atoms.

6. The nematic liquid crystal composition according to claim 5, wherein the content of the at least one compound represented by general formula (I) is 0.001% to 1% by mass, and the content of the at least one compound represented by general formula (II) is 10% to 70% by mass.

7. The nematic liquid crystal composition according to claim 6, further comprising a polymerizable compound represented by general formula (V):

[Chem. 6]

(V)
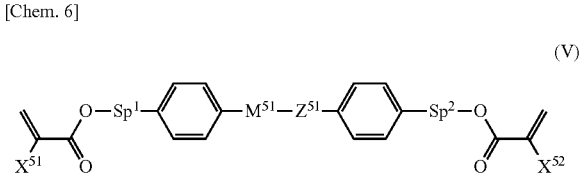

where $X^{51}$ and $X^{52}$ each independently represent a hydrogen atom or a methyl group;
$Sp^1$ and $Sp^2$ each independently represent a single bond, an alkylene group having 1 to 8 carbon atoms, or —O—$(CH_2)_s$—
where s represents an integer of 2 to 7 and the oxygen atom is bonded to an aromatic ring;
$Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where Y$^1$ and Y$^2$ each independently represent a fluorine atom or a hydrogen atom), —C≡C—, or a single bond; and
$M^{51}$ represents a 1,4-phenylene group, a trans-1,4-cyclohexylene group, or a single bond, and any hydrogen atom in all the 1,4-phenylene groups in the formula may be substituted with a fluorine atom.

8. A liquid crystal display element for active-matrix driving, the liquid crystal display element comprising the liquid crystal composition according to claim 7.

9. A liquid crystal display element for an IPS mode, an FFS mode, or a VA-IPS mode, the liquid crystal display element comprising the liquid crystal composition according to claim 7.

10. A polymer-stabilized mode liquid crystal display element produced by using the nematic liquid crystal composition according to claim 7, the liquid crystal composition containing a polymerizable compound, and polymerizing the polymerizable compound contained in the liquid crystal composition with or without application of a voltage.

11. The nematic liquid crystal composition according to claim 1, wherein the first component further comprises a compound represented by the formula (1-b):

(I-b)
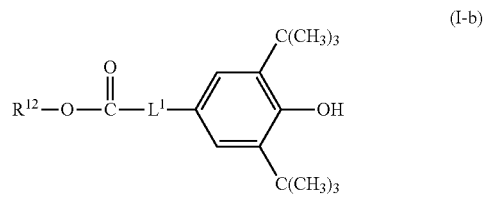

wherein $R^{12}$ is a linear alkyl group or branched alkyl group having 1 to 20 carbon atoms, and $L^1$ is a linear alkylene group or branched alkylene group having 1 to 8 carbon atoms.

12. The nematic liquid crystal composition according to claim 1, wherein the first component is represented by the formula (1-c):

(I-c)
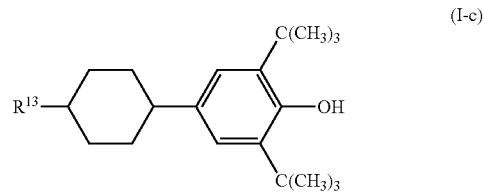

wherein $R^{13}$ is a linear alkyl group, branched alkyl group, linear alkoxy group, or branched alkoxy group having 1 to 8 carbon atoms.

13. The nematic liquid crystal composition according to claim 1, wherein the first component is represented by the formula (1-c-1)

(I-c-1)
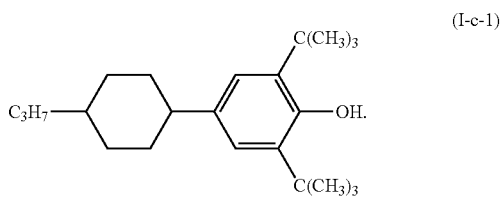

14. A nematic liquid crystal composition comprising:
as a first component, at least one compound represented by general formula (I):

[Chem. 1]

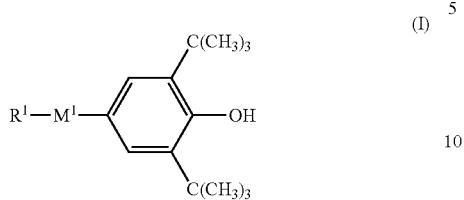

where $R^1$ represents a linear or branched alkyl group having 1 to 22 carbon atoms and one $CH_2$ group in the alkyl group may be substituted with —O—; and $M^1$ represents a trans-1,4-cyclohexylene group;
as a second component, at least one compound selected from the group consisting of compounds represented by general formulae (II-a) to (II-e):

[Chem. 2]

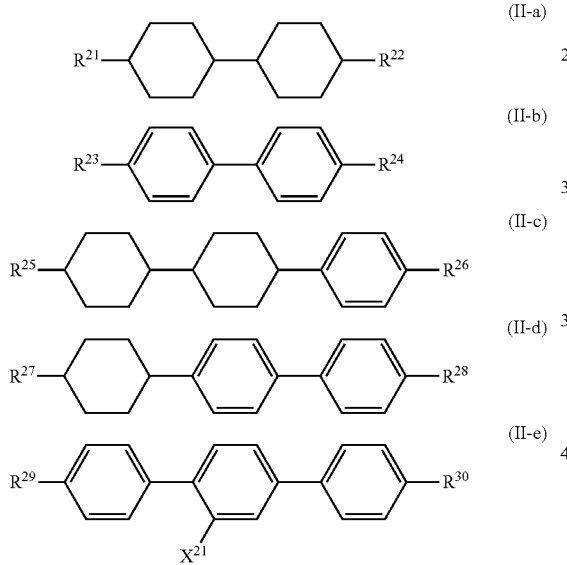

where $R^{21}$ to $R^{30}$ each independently represent an alkyl group having 1 to 10 carbon atoms or an alkenyl group having 2 to 10 carbon atoms and $X^{21}$ represents a hydrogen atom or a fluorine atom, wherein a dielectric anisotropy ($\Delta\varepsilon$) at 25° C. is +3.5 or more, and
a third component, at least one compound represented by general formula (III):

[Chem. 3]

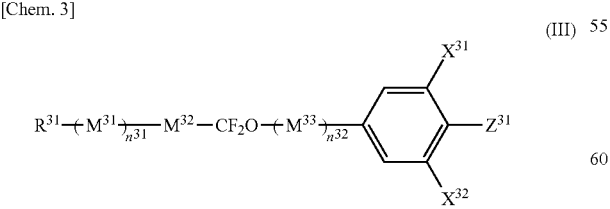

where $R^{31}$ represents an alkyl group or alkoxy group having 1 to 10 carbon atoms, or an alkenyl group or alkenyloxy group having 2 to 10 carbon atoms; $M^{31}$ to $M^{33}$ each independently represent a trans-1,4-cyclohexylene group or a 1,4-phenylene group, one or two —CH2- groups in the trans-1,4-cyclohexylene group may be substituted with —O— so that oxygen atoms are not directly adjacent to each other, and one or two hydrogen atoms in the phenylene group may be substituted with a fluorine atom; $X^{31}$ and $X^{32}$ each represent a fluorine atom; $Z^{31}$ represents a fluorine atom; $n^{31}$ and $n^{32}$ each independently represent 0, 1, or 2; $n^{31}+n^{32}$ represents 0, 1, or 2; and when plural $M^{31}$s and $M^{33}$s are present, they may be the same or different.

15. The nematic liquid crystal composition according to claim 14, wherein general formula (III) is represented by any one of general formulae (III-a) to (III-e):

[Chem. 4]

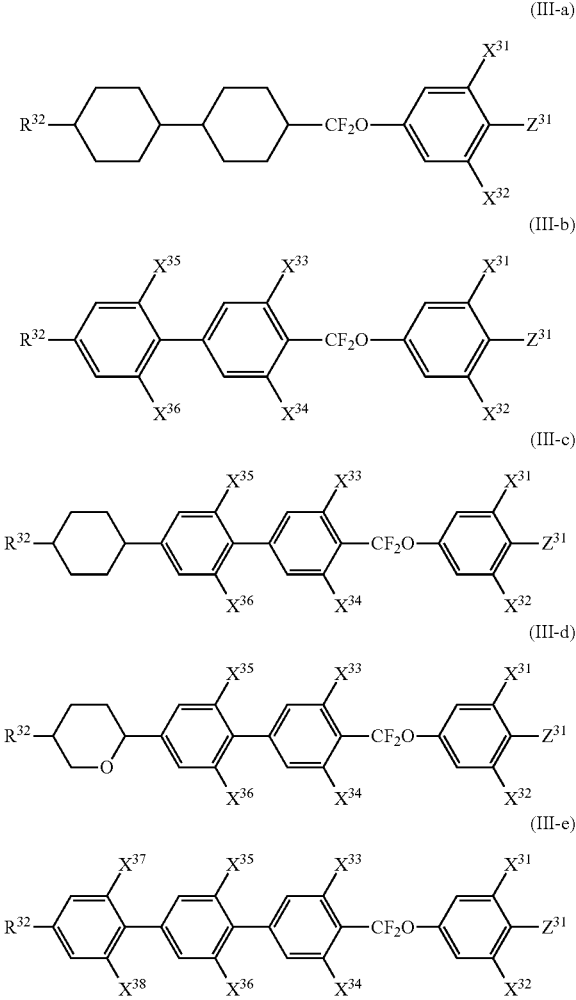

where $R^{32}$ represents an alkyl group or alkoxy group having 1 to 10 carbon atoms, or an alkenyl group or alkenyloxy group having 2 to 10 carbon atoms; $X^{31}$ to $X^{32}$ each represent a fluorine atom, $X^{33}$ to $X^{38}$ each independently represent a hydrogen atom or a fluorine atom; and $Z^{31}$ represents a fluorine atom, a trifluoromethoxy group, or a trifluoromethyl group.

16. The nematic liquid crystal composition according to claim 15, further comprising at least one compound selected from the group consisting of compounds represented by general formulae (IV-a) to (IV-f):

[Chem. 5]

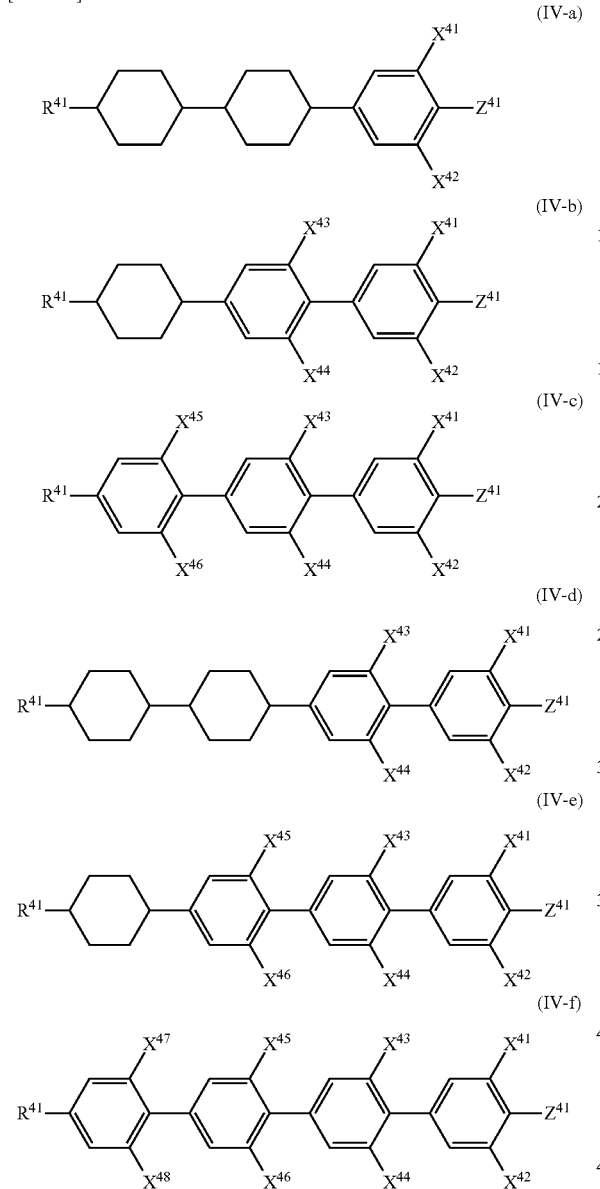

where $R^{41}$ represents an alkyl group or alkoxy group having 1 to 10 carbon atoms, or an alkenyl group or alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group.

17. The nematic liquid crystal composition according to claim 16, further comprising a polymerizable compound represented by general formula (V):

[Chem. 6]

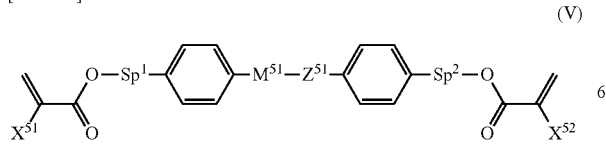

where $X^{51}$ and $X^{52}$ each independently represent a hydrogen atom or a methyl group;

$Sp^1$ and $Sp^2$ each independently represent a single bond, an alkylene group having 1 to 8 carbon atoms, or —O—$(CH_2)_s$— where s represents an integer of 2 to 7 and the oxygen atom is bonded to an aromatic ring;

$Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where Y$^1$ and Y$^2$ each independently represent a fluorine atom or a hydrogen atom), —C≡C—, or a single bond; and $M^{51}$ represents a 1,4-phenylene group, a trans-1,4-cyclohexylene group, or a single bond, and any hydrogen atom in all the 1,4-phenylene groups in the formula may be substituted with a fluorine atom.

18. A polymer-stabilized mode liquid crystal display element produced by using the nematic liquid crystal composition according to claim 17, the liquid crystal composition containing a polymerizable compound, and polymerizing the polymerizable compound contained in the liquid crystal composition with or without application of a voltage.

19. The nematic liquid crystal composition according to claim 14, wherein the first component further comprises a compound represented by the formula (1-b):

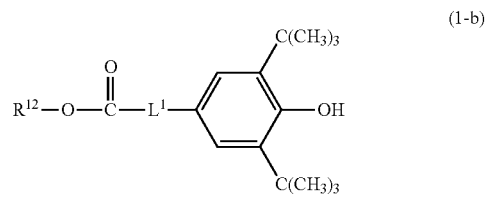

wherein $R^{12}$ is a linear alkyl group or branched alkyl group having 1 to 20 carbon atoms, and $L^1$ is a linear alkylene group or branched alkylene group having 1 to 8 carbon atoms.

20. The nematic liquid crystal composition according to claim 14, wherein the second component comprises a compound represented by general formula (II-a)

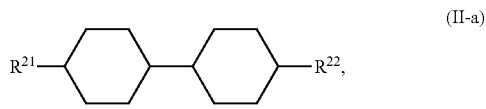

and wherein the third component comprises at least one compound selected from the group consisting of compounds represented by general formulae (III-b), (III-d) and (III-e)

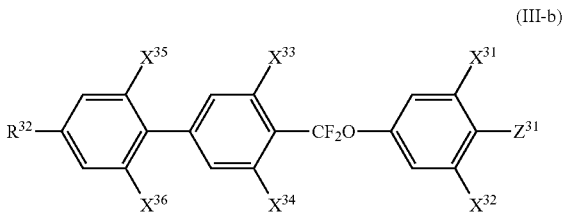

-continued

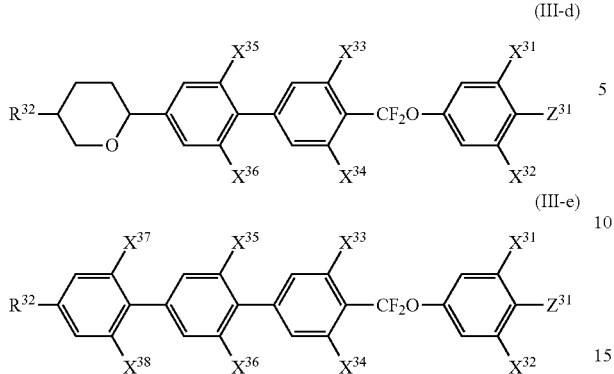

where $R^{21}$ to $R^{22}$ each independently represent an alkyl group having 1 to 10 carbon atoms or an alkenyl group having 2 to 10 carbon atoms, $R^{32}$ represents an alkyl group or alkoxy group having 1 to 10 carbon atoms, or an alkenyl group or alkenyloxy group having 2 to 10 carbon atoms; $X^{31}$ to $X^{32}$ each represent a fluorine atom, $X^{33}$ to $X^{38}$ each independently represent a hydrogen atom or a fluorine atom; and $Z^{31}$ represents a fluorine atom.

* * * * *